United States Patent
Weis et al.

(10) Patent No.: US 6,837,267 B2
(45) Date of Patent: Jan. 4, 2005

(54) CARTRIDGE INSERT FOR A FLUID LINE

(75) Inventors: Christoph Weis, Lörrach (DE); Uwe Zoller, Müllheim (DE)

(73) Assignee: Neoperl GmbH, Mullheim (DE)

( * ) Notice: Subject to any disclaimer, the term of this patent is extended or adjusted under 35 U.S.C. 154(b) by 0 days.

(21) Appl. No.: 10/472,645

(22) PCT Filed: Mar. 14, 2002

(86) PCT No.: PCT/EP02/02869
§ 371 (c)(1),
(2), (4) Date: Sep. 22, 2003

(87) PCT Pub. No.: WO02/077736
PCT Pub. Date: Oct. 3, 2002

(65) Prior Publication Data
US 2004/0079418 A1 Apr. 29, 2004

(30) Foreign Application Priority Data
Mar. 22, 2001 (DE) .......................................... 101 14 261

(51) Int. Cl.[7] ................................................. G05D 7/01
(52) U.S. Cl. ....................... 137/542; 137/269; 137/613; 137/860; 251/120
(58) Field of Search ................................. 137/269, 271, 137/540, 542, 512.3, 613; 251/120, 368

(56) References Cited
FOREIGN PATENT DOCUMENTS

| DE | 32 22 548 A1 | 12/1983 |
|---|---|---|
| DE | 34 10 186 A1 | 9/1985 |
| DE | 87 03 945.1 U1 | 6/1987 |
| WO | WO 98/38555 | * 9/1998 |

* cited by examiner

Primary Examiner—Ramesh Krishnamurthy
(74) Attorney, Agent, or Firm—Volpe and Koenig, P.C.

(57) ABSTRACT

A cartridge insert for insertion in a fluid line is provided having a cartridge housing within which is located at least one backflow inhibitor and downstream at least one flow regulator. The backflow inhibitor has a closing element, which, in a closed position thereof, lies tightly sealed on a valve seat of the cartridge housing and which may be displaced from the closed position against a return force into an open position. A downstream guide pin projects from the closing element, and extends into a guide opening of a central regulator core of the flow regulator, and the flow regulator is formed from a regulator element made from an elastic material that surrounds the regulator core, which rests on an annular shoulder and defines a control gap, which changes with pressure between the above and an opposing enclosing wall. The cartridge insert is compact and space saving in that the flow regulator terminates generally flush with the downstream side of the cartridge and the annular shoulder projects from the regulator core and the control gap is provided between the regulating element and an inside of the cartridge housing which forms the enclosing wall.

12 Claims, 2 Drawing Sheets

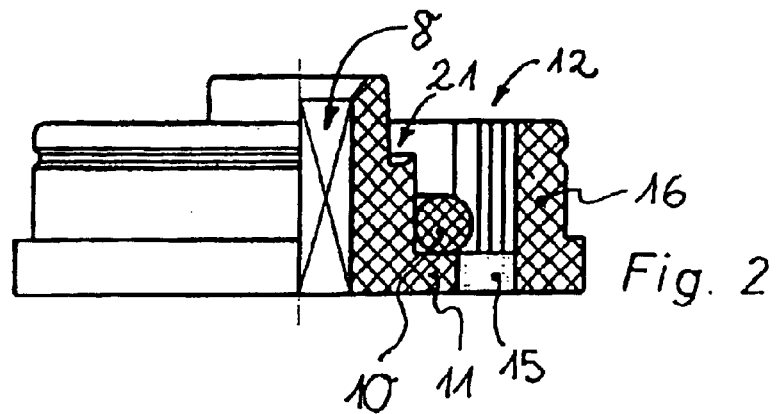
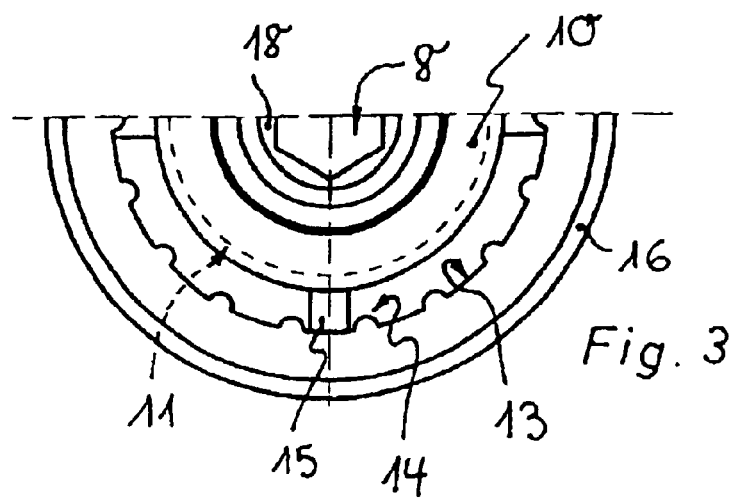
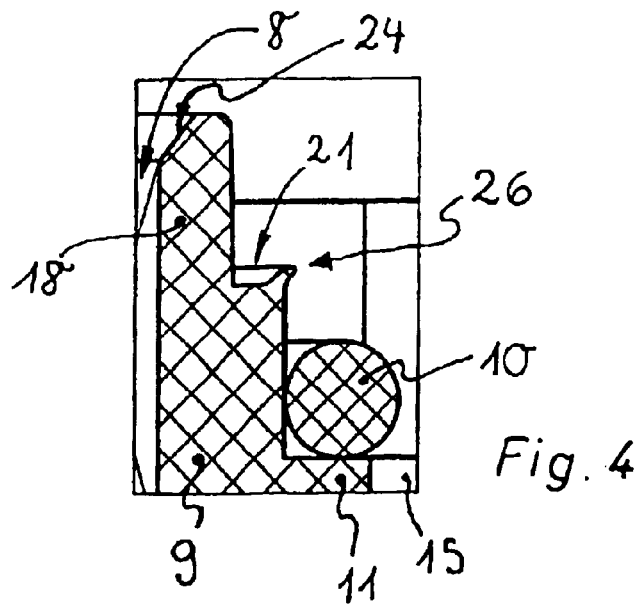

US 6,837,267 B2

CARTRIDGE INSERT FOR A FLUID LINE

BACKGROUND

The present invention relates to a cartridge insert for insertion in a fluid line, having in its cartridge housing at least one backflow inhibitor and, downstream, at least one flow regulator. The backflow inhibitor has a closing element that in its closed position lies tightly on a valve seat of the cartridge housing and can be moved from this closed position against a return force into an open position. A guide pin, situated downstream, protrudes from the closing element and is guided in the guide opening of a central regulator core of the flow regulator. The flow regulator has a regulator element, made of elastic material, that surrounds the regulator core and that lies on an annular shoulder or on a similar regulator element support element, and that limits, between itself and an enclosing wall situated opposite, a control gap that changes in a manner dependent on pressure.

Cartridge inserts of this sort are used for example in sanitary water lines in order to prevent an undesired backflow in particular of service water or water for industrial use, and in order at the same time to enable an evening out of the flow quantity per time unit, even when there are pressure fluctuations in the network of water lines.

Thus, for example, a cartridge insert of the type named above is known that has a two-part cartridge housing. While the backflow inhibitor is provided in the upstream housing part, the downstream housing part, which can be locked therewith in detachable fashion, comprises the flow regulator. The flow regulator has a three-part construction, and has a central regulator core that surrounds a regulator element made of elastic material. This regulator element, which limits between itself and the enclosing wall of the regulator core a control gap that changes in a manner dependent on pressure, lies on an annular shoulder that protrudes radially inwardly on the downstream end edge area of the cartridge housing.

In this known cartridge insert, the guide pin, which protrudes from the downstream side of the closing element, is guided in a guide opening of the central regulator core. Because the regulator core acts on the one hand as a guide means for the closing element, but on the other hand also limits the control gap of the flow regulator, having regulator profilings oriented in the longitudinal direction for this purpose, the regulator core is to be fashioned thick and long enough that it protrudes outwardly significantly past the downstream end opening of the cartridge insert.

Because the comparatively thick regulator core in this known cartridge insert protrudes past the end opening thereof, it is not always possible to accommodate the cartridge insert in the connection fitting of a water line without problems.

SUMMARY

The object therefore arises in particular of creating a cartridge insert of the type noted above that can be manufactured economically and that has, due to its compact design, a low space requirement for installation, so that for example, connections in series with additional insert parts are also possible, without using spacing elements.

According to the present invention, this object is achieved in the cartridge insert of the type noted above in that, in particular, by having the flow regulator terminate approximately flush with the downstream side of the cartridge housing, and that for this purpose the annular shoulder protrudes on the regulator core, and the control gap is provided between the regulating element and the inside of the cartridge housing enclosing wall.

Because the flow regulator of the cartridge insert according to the present invention terminates approximately flush with the downstream side of the cartridge housing, a regulator core does not protrude past the downstream end opening in a disturbing manner, which could require additional space and could reduce the inner flow cross-section in the area of a connection fitting. In the cartridge insert according to the present invention, the control gap of the flow regulator is provided between the elastic regulator element on the one hand and the inside of the cartridge housing enclosing wall on the other hand, while the annular shoulder supporting the regulating element is provided on the regulator core. Because the regulator core thus does not have to additionally comprise the standard regulator profilings, and because these regulator profilings can instead be situated on the enclosing wall of the cartridge housing, the regulator core can have comparatively small dimensions. Due to the compact design of the cartridge insert according to the present invention, it can be manufactured at a low expense.

The low manufacturing expense, and the number of parts required for the manufacture of the cartridge insert according to the present invention, can be reduced if the cartridge housing enclosing wall is connected in one piece with the regulator core in the area of the flow regulator.

Here, a preferred specific embodiment according to the present invention provides that the annular shoulder on the regulator core is connected with the enclosing wall of the cartridge housing via connecting webs. While the regulator element lies on the annular shoulder, passage openings are provided between the adjacent connecting webs, forming an essentially annular flow-through duct that surrounds the annular shoulder.

It is particularly advantageous if the cartridge housing is constructed in at least two parts, and has, in the area of the flow regulator, a cup-type or bowl-type housing part that can be connected in detachable fashion, by locking or the like, with an adjacent upstream housing part. The two-part construction of the cartridge housing, and the detachable connection of its housing parts, makes it possible to realize the cartridge insert according to the present invention as a component of a modular system, from whose components different sanitary insertion parts can be assembled.

Because increasing water pressure can significantly expand the elastic annular regulating element, thus correspondingly narrowing the control gap, it is useful if the regulator core has an outer diameter that corresponds approximately to the inner diameter of the regulating element.

In order to be able to construct the flow regulator of the cartridge insert according to the present invention in a manner adapted to the desired flow rate, it is advantageous if regulating protrusions and/or recesses are provided that are situated at intervals from one another in the peripheral direction on the inside of the cartridge housing enclosing wall, and are oriented in the direction of flow.

A preferred specific embodiment, distinguished by a particularly compact construction and disturbance-free operation, provides that the regulator core has a plug-on projection for a return spring that loads the closing element in the closed position, and that the plug-on projection is dimensioned so as to accommodate at least a large part of the pressure spring in the stressed position. Here, disturbance-free operation and the compact construction of the cartridge insert according to the present invention are further promoted if the closing element has an annular groove downstream that receives one end of the pressure spring.

In order to ensure a reliable and disturbance-free functioning of the backflow inhibitor as well, it is advantageous if the closing element has, in the sealing area, an annular groove having a sealing ring placed therein, and if the valve seat tapers in the closing direction, preferably conically.

The cartridge insert according to the present invention, and the individual parts thereof, can be manufactured from any suitable materials. However, in order to further promote the low manufacturing cost, it is advantageous if the cartridge housing, which may be made up of a multiplicity of parts, and/or the closing element are made of plastic and are injection-molded parts.

BRIEF DESCRIPTION OF THE DRAWINGS

Further features of the present invention result from the following specification of a preferred exemplary embodiment according to the present invention, in connection with the claims and the drawing. The individual features can be realized alone or in combination in a specific embodiment according to the present invention.

in FIG. 1 the flow inhibitor is shown in the left half of the Figure in its closed position and is shown in the right half of the Figure in its open position, FIG. 2 shows the housing part having the flow regulator in a partial longitudinal section, FIG. 3 shows the housing part from FIG. 2 in a top view of the upstream end side, and FIG. 4 shows the housing part, comprising the flow regulator, from FIGS. 2 and 3 in a partial longitudinal section, in the area of a central regulator core.

DETAILED DESCRIPTION OF THE PREFERRED EMBODIMENTS

Figure 1:
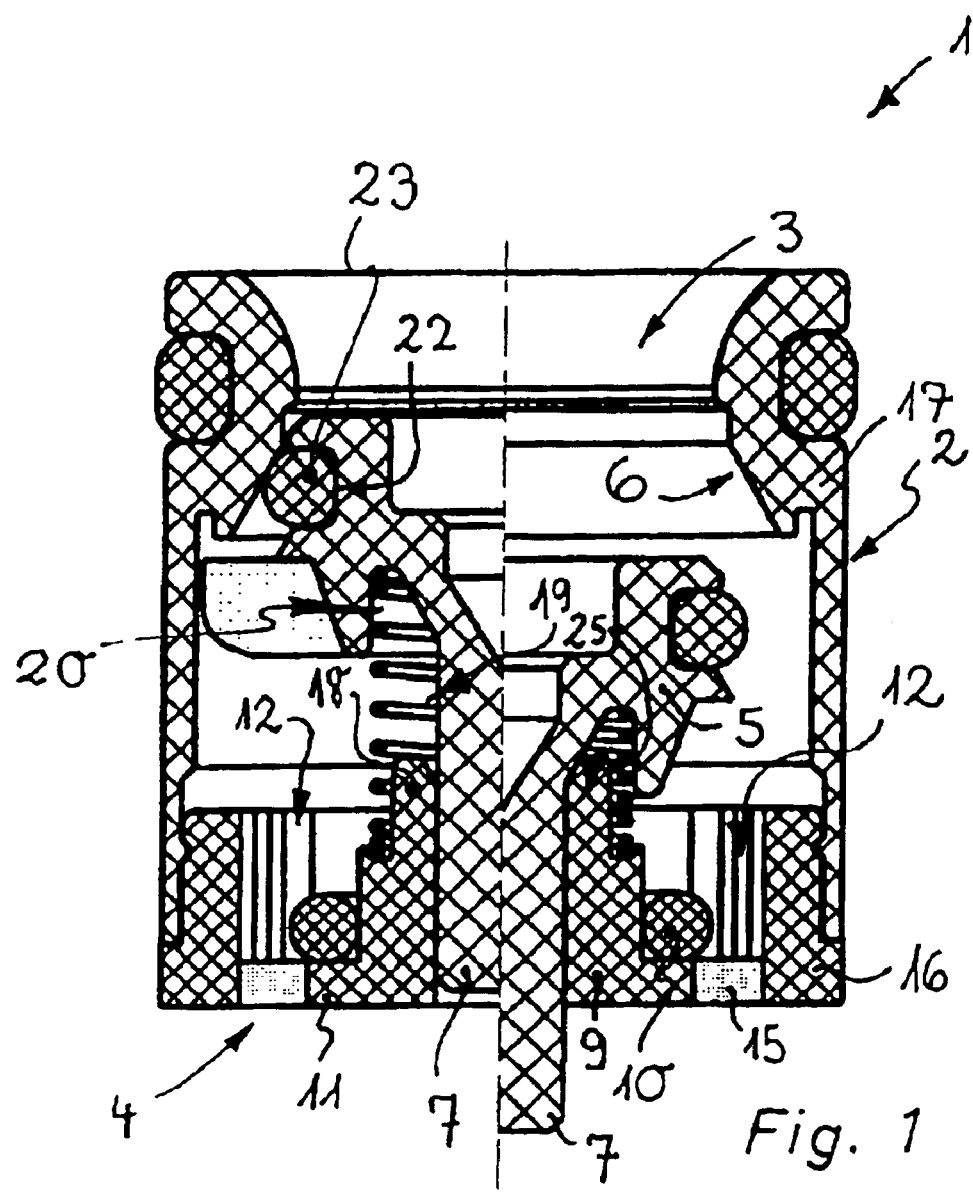
FIG. 1 shows a cartridge insert, shown in longitudinal section, for insertion into a sanitary water line, having in its cartridge housing a backflow inhibitor and a flow regulator situated downstream.

In FIGS. 1 to 3, a cartridge insert 1 is shown that can be placed into a corresponding recess in a connecting fitting of a sanitary water line. The cartridge insert 1 has in its cartridge housing 2 a backflow inhibitor 3 and a flow regulator 4 situated downstream. While the backflow inhibitor 3 is intended to prevent an undesired backflow of the liquid stream opposite to the standard direction of flow, with the aid of the flow regulator 4 the flow rate of the stream of water passing through the cartridge insert 1 is defined at a target value per time unit.

The backflow inhibitor 3 has a closing element 5 that lies tightly on a valve seat 6 of the cartridge housing 2 in the closed position shown in the left half of FIG. 1, and can be moved against a return force from this closed position into an open position, shown in the right half of FIG. 1.

From FIG. 1, it can be seen clearly that a downstream guide pin 7 protrudes from the closing element 5 of the backflow inhibitor 3, said pin being guided in a guide opening 8 of a central regulator core 9 of the flow regulator 4. The flow regulator 4 has an annular regulating element 10 that is made of elastic material and that surrounds the regulator core 9, and lies on an annular shoulder 11. The annular shoulder 11 protrudes in the radial direction on the regulator core 9. The flow regulator 4 limits, between itself and the oppositely situates cartridge housing enclosing wall, a control gap 12 that changes in a manner dependent on pressure.

In FIGS. 2 and 3, it can be seen that regulating recesses and protrusions 13, 14 are provided on the inside of the enclosing wall of the cartridge housing, their shape being adapted to the desired flow rate. Because the regulating profilings 13, 14, oriented in the direction of flow, are provided on the enclosing wall of the cartridge housing and not on the regulator core 9, the regulator core 9 can be constructed with a comparatively short longitudinal extension and a small diameter, in such a way that the flow regulator 4 terminates approximately flush with the downstream side of the cartridge housing 2. Due to this compact construction of the cartridge insert 1, this insert can be housed in the standard connecting supports of sanitary water lines.

From FIGS. 1 and 2, it can be seen that the enclosing wall of the cartridge insert is connected in one piece with the regulator core 9 in the area of the flow regulator 4. For this purpose, the annular shoulder 11 provided on the regulator core 9 is connected with the enclosing wall of the cartridge housing via spoke-shaped connecting webs 15 spaced at intervals from one another in the peripheral direction. A passage opening is provided between each pair of adjacent connecting webs 15. These passage openings form an essentially annular flow-through duct situated coaxially to the longitudinal axis of the cartridge insert.

From a comparison of FIG. 1 on the one hand and FIGS. 2 and 3 on the other hand, it is clear that the cartridge housing 2 has a two-part construction, and has in the area of the flow regulator 4, a cup-type housing part 16 that can be locked with an adjacent upstream housing part 17. The cartridge insert 1 shown here can thus be a component of a modular system, from whose functional units, which can individually be connected with one another, various sanitary insert parts can be assembled.

In FIGS. 1 to 2, it can be seen clearly the that regulator core 9 has a plug-on projection 18 for a return spring 19 that loads the closing element 5 in the closing direction. Here, the plug-on projection 18 is dimensioned so as to receive at least a large part of the pressure spring 19 in the stressed position. Annular grooves 20, 21 are provided both downstream on the closing element 5 and also at the foot of plug-on projection 18, in order to receive the ends of the return spring 19 at the end side. The regulator core 9 has an outer diameter that corresponds approximately to the inner diameter of the annular regulating element 10. The annular shoulder 11 has a radial extension that extends slightly beyond half the diameter of the annular element. The closing element 5 has in the sealing area an annular groove 22 having a sealing ring 23 placed therein. In order to ensure disturbance-free functioning of the backflow inhibitor 3, the valve seat 6 tapers approximately conically in the closing direction. The housing parts 16, 17 of the cartridge housing 2, and preferably also the closing element 5, are manufactured as injection-molded parts made of plastic. Because the flow regulator 3 of the cartridge insert 1 shown here is made up essentially only of two individual parts, namely the regulator element 10 and the housing part 16, the manufacturing expense for the cartridge insert 1 can be significantly reduced.

From a comparison of FIGS. 1 to 4, it is clear that the edge area 24, facing the closing element 5, of the guide opening 8 has a sealing cone, while a complementarily formed, cone-shaped partial area 25 is provided on the guide pin 7 of the closing element 5. The sealing cone 24 of the guide opening 8, and complementarily formed partial area 25 of the guide pin 7, fit together in the open position of the closing element 5 shown in FIG. 1 in such a way that undesired flowing of liquid through the guide opening 8 can be avoided.

In FIG. 4, it is shown that the outer groove edge, limiting annular groove 21 provided on the plug-on projection 18 of the regulator core 9, is bent outward in order to secure the regulating element 10. This bending of the outer edge of the groove can take place through thermal and/or mechanical action on the edge of the groove.

The cartridge insert 1 shown here is distinguished by its compact construction, which also enables the connection in series of two such cartridge inserts 1, if two flow inhibitors 3 acting in the same flow direction have been recommended for reasons of safety.

What is claimed is:

1. A cartridge insert (1) for insertion in a fluid line, comprising a cartridge housing (2) having at least one backflow inhibitor (3) therein and at least one flow regulator (4) located downstream in a flow direction therefrom, the backflow inhibitor (3) having a closing element (5) that in a closed position lies tightly on a valve seat (6) of the cartridge housing (2) and can be moved from the closed position against a return force into an open position, a guide pin (7) protrudes from a downstream side of closing element (5) and is guided in a guide opening (8) of a central regulator core (9) of the flow regulator (4), and the flow regulator (4) having a regulator element (10), made of elastic material, that surrounds the regulator core (9) and that lies on an annular shoulder (11) or a regulator element support member, and that limits, between the regulator element (10) and an enclosing wall situated opposite thereto, a control gap (12) that changes in a manner dependent on pressure, wherein the flow regulator (4) terminates approximately flush with the downstream side of the cartridge housing (2), and annular shoulder (11) or regulator element support member protrudes from the regulator core (9), and the control gap (12) is provided between the regulating element (10) and an inside of the cartridge housing which forms the enclosing wall.

2. The cartridge insert as recited in claim 1, wherein the enclosing wall of the cartridge housing is connected in one piece with the regulator core (9) in an area of the flow regulator (4).

3. The cartridge insert as recited in claim 1, wherein the annular shoulder (11) situated on the regulator core (9) is connected with the enclosing wall of the cartridge housing via connecting webs (15).

4. The cartridge insert as recited in claim 1, wherein the cartridge housing (2) is constructed in at least two parts, and has in an area of the flow regulator (4) a cup-type housing part (16) that can be connected in detachable fashion, with an adjacent upstream housing part (17).

5. The cartridge insert as recited in claim 1, wherein the regulator core (9) has an outer diameter that corresponds approximately to an inner diameter of the regulating element (10).

6. The cartridge insert as recited in claim 1, wherein regulating protrusions and/or recesses (14, 13) are provided on an inside of the enclosing wall of the cartridge housing, spaced at intervals from one another in a peripheral direction and oriented in the direction of flow.

7. The cartridge insert as recited in claim 1, wherein the regulator core (9) has a plug-on projection (18) for a pressure spring (19) that loads the closing element (5) in the closing direction, and the plug-on projection (18) is dimensioned so as to receive at least a large part of the pressure spring (19) in the stressed position.

8. The cartridge insert as recited in claim 1, wherein the closing element (5) has on a downstream side thereof an annular groove (20) that receives one end of the pressure spring (19).

9. The cartridge insert as recited in claim 1, wherein the closing element (5) has in the sealing area an annular groove (22) having a sealing ring (23) placed therein, and the valve seat (6) tapers in the closing direction.

10. The cartridge insert as recited in claim 1, wherein the cartridge housing (2), which may have a multiplicity of parts, and/or the closing element (5) are made of plastic and are injection-molded parts.

11. The cartridge insert as recited in claim 1, wherein the edge area (24), facing the closing element (5), of the guide opening (8), has a sealing cone, and that a complementarily formed cone-shaped partial area (25) is provided on the guide pin (7) of the closing element (5), and the two areas (24, 25) fit together in a sealing fashion in the open position of the closing element (5).

12. The cartridge insert as recited in claim 1, wherein an annular groove (21) is provided on the plug-on projection (18) of the regulator core (9) in order to receive the other end of the pressure spring (19), and an outer groove edge (26) is bent or angled outward in order to secure the regulating element (10) on the regulator core (9).

* * * * *